United States Patent [19]

Hart

[11] Patent Number: 4,583,155
[45] Date of Patent: Apr. 15, 1986

[54] SIDE MOUNTED REAR VIEW MIRROR WITH BRAKE LIGHT

[76] Inventor: Robert L. Hart, 19459 Manor, Detroit, Mich. 48221

[21] Appl. No.: 646,750

[22] Filed: Sep. 4, 1984

[51] Int. Cl.⁴ ............................. F21V 7/00; B60Q 1/26
[52] U.S. Cl. ........................................ 362/285; 340/69; 340/87; 340/98; 340/138; 362/61; 362/80; 362/372; 362/427
[58] Field of Search ................... 362/80, 83, 135, 140, 362/61, 285, 287, 372, 427, 431; 340/69, 87, 98, 22, 52, 84, 138, 140, 144, 145

[56] References Cited

U.S. PATENT DOCUMENTS

| | | | |
|---|---|---|---|
| 1,814,728 | 7/1931 | Moore | 362/135 |
| 2,180,610 | 11/1939 | Ritz-Woller | 362/135 |
| 2,595,331 | 5/1952 | Calihan et al. | 362/135 |
| 3,266,016 | 8/1966 | Maruyama et al. | 362/135 |
| 3,532,871 | 10/1970 | Shipman | 362/83 |
| 4,023,029 | 5/1977 | Fischer | 362/135 |
| 4,274,078 | 6/1981 | Isobe | 340/98 |
| 4,463,411 | 7/1984 | Proctor | 362/80 |
| 4,475,100 | 10/1984 | Duh | 362/135 |
| 4,479,172 | 10/1984 | Connor | 362/135 |

FOREIGN PATENT DOCUMENTS

| | | | |
|---|---|---|---|
| 1063695 | 10/1979 | Canada | 340/98 |
| 3017405 | 11/1981 | Fed. Rep. of Germany | 340/98 |
| 3023477 | 1/1982 | Fed. Rep. of Germany | 340/98 |
| 3037984 | 5/1982 | Fed. Rep. of Germany | 340/69 |
| 3041507 | 6/1982 | Fed. Rep. of Germany | 340/69 |
| 3045304 | 7/1982 | Fed. Rep. of Germany | 340/74 |
| 0268359 | 7/1927 | United Kingdom | 340/98 |

Primary Examiner—Stephen J. Lechert, Jr.
Assistant Examiner—Howard J. Locker
Attorney, Agent, or Firm—Irving M. Weiner; Joseph P. Carrier; Cantarella, John J.

[57] ABSTRACT

A brake light incorporated in a side view mirror housing is disclosed. The brake light may be fixedly attached to the housing and viewable from the rear of the vehicle. Brake lights which move from a stored position within said mirror housing to an in use position exterior of said housing are also disclosed. The further the brake light portion is from the vehicle the more viewable it will be from the rear of the vehicle.

8 Claims, 9 Drawing Figures

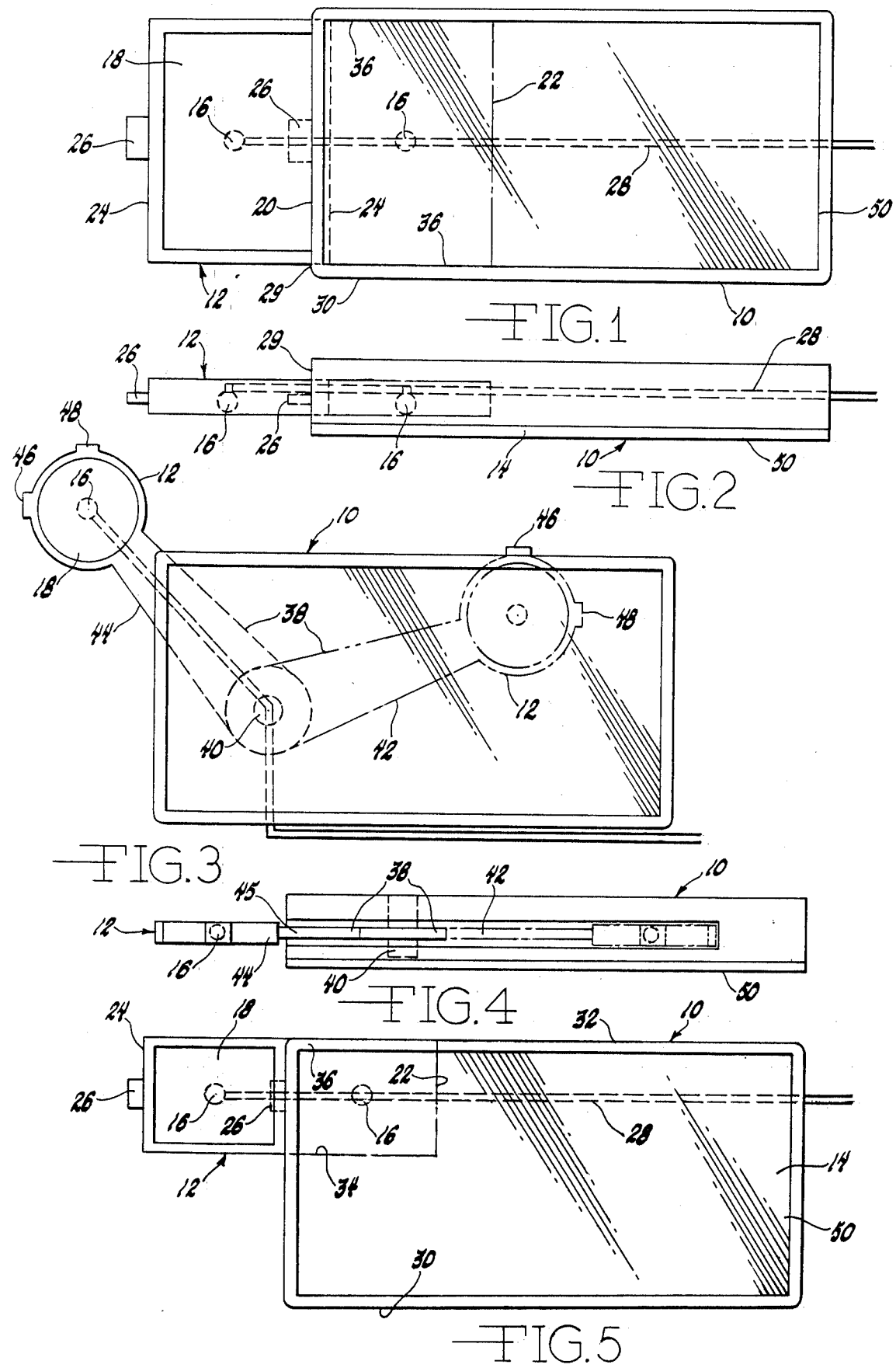

4,583,155

SIDE MOUNTED REAR VIEW MIRROR WITH BRAKE LIGHT

BACKGROUND OF THE INVENTION

1. Field of the Invention

This invention is in the field of brake lights. More particularly, the invention is a brake light for automotive application.

2. Description of the Relevant Art

Brake lights are illuminated when the driver of the motor vehicle they are on applies the brakes. Because the brake lights are positioned at the tail end of the motor vehicle, their illumination informs drivers to the rear that the brakes have been applied, and this allows them to anticipate and respond to the slow down or stoppage of the forward vehicle.

One drawback of existing brake lights is that generally only the vehicles immediately behind the lights can see them. This is due to the fact that brake lights are mounted on the rearward most wall of the motor vehicle.

When a number of cars are traveling in the same direction, some of the drivers of trailing vehicles may not be able to see the illuminated brake lights of a forward vehicle. Those drivers will not be able to anticipate or prepare for the slow down of that vehicle. This situation has and can lead to rear end collisions.

The invention of this patent is a side mounted rear view mirror having an attached brake light. This side mounted brake light is visible to a greater field of drivers than the traditional rear mounted brake lights. Thus a greater number of drivers will be in a position to see the brake lights illuminated. This should reduce a potential cause of rear end collisions.

The United States Government has recently mandated the placement of a second set of brake lights in the rear window of passenger vehicles.

No side mounted brake lights were discovered in a United States Patent Office search. Several patents were found in which turn signal indicators were incorporated in side view mirrors. Those patents are U.S. Pat. No. 2,580,014; U.S. Pat. No. 2,595,331; U.S. Pat. No. 2,600,751; and U.S. Pat. No. 2,629,087. U.S. Pat. No. 4,171,875 disclosed a multiple position rearview mirror having a mirror position indicator light. Neither these patents nor the rear window brake lights mandated by the U.S. Government teach or suggest the invention disclosed herein.

Furthermore, the invention disclosed herein provides advantages that are not possessed by currently known brake lights.

SUMMARY OF THE INVENTION

The invention is a brake light mountable on the side of a motor vehicle. Preferably, the brake light is incorporated into a side view mirror housing, and is recessed with respect to the sideview mirror device such that it is shielded from the view of the primary driver to prevent distractions, i.e., the brake light can only be seen by trailing drivers. The brake light of this invention can augment the standard brake lights presently found on the rear end of motor vehicles.

The brake lights of this invention can be mounted on the same surface of the mirror housing as the mirror or the brake lights can be mounted on their own surface.

Moreover, the brake lights of this invention can be located in a permanently fixed position or they can be designed to move from one location to another. When the brake lights are designed to be moved, it is preferred that they be movable from a storage position within the mirror housing to an operational position outside said mirror housing.

BRIEF DESCRIPTION OF THE DRAWINGS

FIG. 1 is a front elevational view of an embodiment of the invention.

FIG. 2 is a top view of the embodiment of the invention of FIG. 1.

FIG. 3 is a front elevational view of a second embodiment of the invention.

FIG. 4 is a top view of the second embodment of the invention depicted in FIG. 3.

FIG. 5 is a front elevational view of a third embodiment of the invention.

DESCRIPTION OF THE PREFERRED EMBODIMENTS

Figure 6:
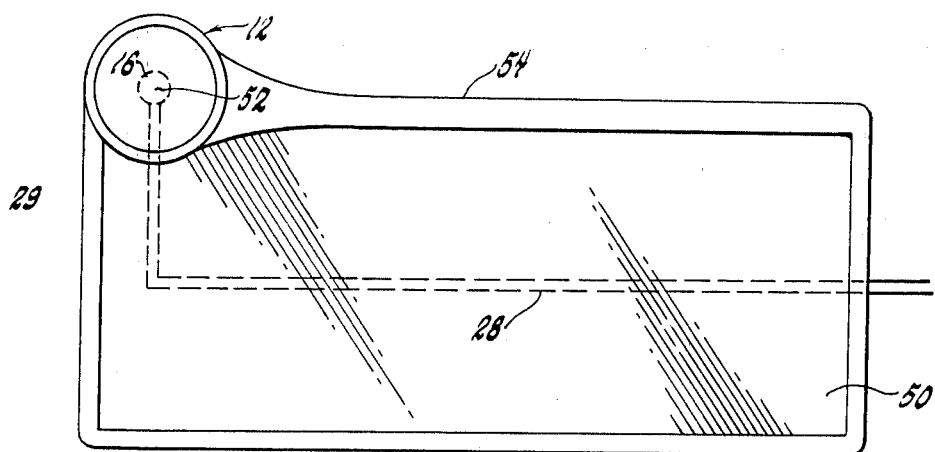
FIG. 6 is a front elevational view of a fourth embodiment of the invention.

As depicted in FIG. 1 and FIG. 2, the invention includes a housing 10 for attachment to the side of a motor vehicle and a brake light 12 attached to said housing 10. Housing 10 has a rearward facing mirror 14 and a rearward facing brake light 12 which is recessed. Brake light 12 has a light bulb 16 and a rear mounted covering 18 through which the light bulb 16 can be seen when light bulb 16 is illuminated. Thus both the mirror 14 and brake light 12 can be seen from the rear of the vehicle.

Housing 10 is rectangular and has an end opening 20 for slidably receiving brake light 12. Brake light 12 is rectangular and demensioned to slide within end opening 20 between an interior position 22 and an extended position 24. When brake light 12 is in interior position 22, brake light 12 is completely encased in housing 10. When brake light 12 is at extended position 24, brake light 12 is substantially exterior to housing 10 and viewable. End opening 20 commences at far side 29 of housing 10; far side 29 preferably being located away from the motor vehicle in a manner to provide maximal extension of brake light 12 away from the vehicle.

Brake light 10 has a tab 26 at its outwardmost end relative to housing 10. Said tab 26 can be gripped to facilitate sliding said brake light 12 between said interior position 22 and said exterior position 24. Preferably, said brake light 12 will lock in place when in exterior position 24 of when in interior position 22 to prevent unwanted sliding of brake light 12 relative to housing 10.

Housing 10 also has an electrical conduit 28 for connecting said light bulb 16 to the vehicle's braking mechanism (not shown).

The size of brake light 12 can be varied. As depicted in FIGS. 1 and 2 brake light 12 is of substantially the same height as mirror 18. As depicted in FIG. 5, brake light 12 need not be of substantially the same height as mirror 30. In FIG. 5, end opening 20 is at the upper most portion of the far side of housing 29, extending between housing top 20 to slightly above the center of far side 29; while in FIGS. 1 and 2, end opening 20 is at the far side of housing 10 extending between housing base 30 and housing top 32. Since brake light 12 tracks on the opening base 34 and the opening top 36, brake light 12 in the embodiment of the invention depicted in FIG. 5 is not as tall relative to housing 10 as is brake light 12 to housing 10 in the embodiment of the invention depicted in FIGS. 1 and 2.

As depicted in FIGS. 3 and 4, brake light 12 is substantially circular and has a handle 38 journaled for rotation, on pin 40 located inside housing 10, between first position 42 and second position 44.

When in first position 42, brake light 12 and handle 38 are completely housed within housing 10. When in second position 44, handle 38 is partially housed within housing 10, but the rest of brake light 12 is outside of said housing 12.

Housing top 36 and far side 29 define an opening 45 of sufficient length to allow brake light 12 to move between first position 42 and second position 44.

In second position 44, brake light 12 extends partly above said housing 10 and beyond far side 29 away from the vehicle.

A first tab 46 and a second tab 48 located on the circumference of circular brake light 12 act as grips to facilitate movement of said brake light 12 between said first position 42 and second position 44. Preferably, said brake light 12 will be reversably lockable in said second position 44 and said first position 42 to prevent unwanted movement relative to said housing 10.

Figure 7:
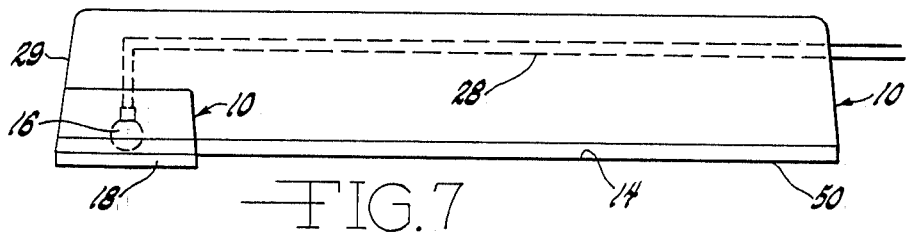
FIG. 7 is a top view of the embodiment of the invention depicted in FIG. 6.

In the embodiment of the invention depicted in FIGS. 6 and 7, housing 10 is substantially rectangular and has a substantially rectangular mirror 14 substantially covering its rear surface 50. Brake light 12 is substantially circular and is incorporated in said housing 10. The center 52 of brake light 12 lies on the line defining the top rectangular edge 54 of housing 10. The radius of brake light 12 extends to far side 29.

Rear mounted covering 18 is provided for brake light 12 Conduit 28 is also provided. In this embodiment, brake light 12 does not move between two positions relative to housing 10, as it did in some of the other described embodiments.

Figure 8:
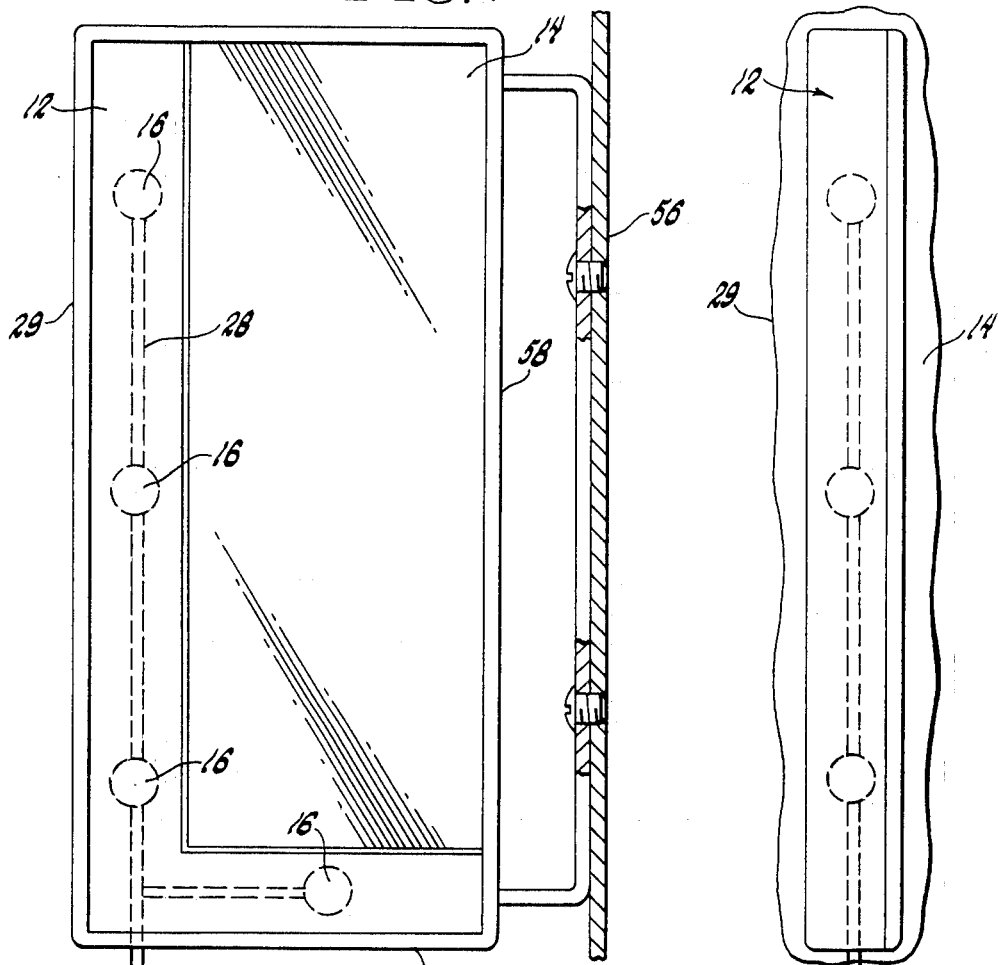
FIG. 8 is a front elevational view of a fifth embodiment of the invention.
Figure 9:
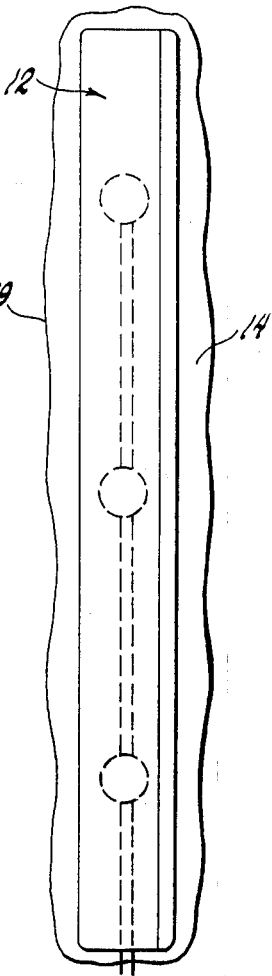
FIG. 9 is a fragmentary rear view of the embodiment of the invention depicted in FIG. 8.

In the embodiment of the invention depicted in FIGS. 8 and 9, housing 10 is rectangular and has a bracket 56 on one of its long sides 58 for mounting said housing 10 on the side of a vehicle.

Mirror 14 is rectangular and mounted on the rear surface 50 of housing 10 and takes up nearly all the surface leaving only a margin 12 between itself and far side 29 and housing base 60, which margin 12 constitutes brake light 12. Margin 12 has at least one light bulb 16 and preferably has a series of light bulbs. Moreover, brake light 12 has covering 18 and conduit 28. This embodiment is particularly suited to trucks, and vans although it can be used on other motor vehicles.

FIG. 9 depicts a portion of brake light 12 of FIG. 8 with light bulbs 16 near far side 29 of housing 10.

In operation, housing 10 will generally be mounted on the side of a motor vehicle with brake light 12 extending as far from the vehicle as possible, even though brake light 12 can be mounted closer to the vehicle mirror 14 if desired.

Generally, in the embodiments depicted in FIGS. 1 through 7, each housing will be mounted to the side of a motor vehicle in such a fashion that the long edges of rectangular housing 10 will be substantially parallel to the ground, and the short edges of the housing 10 will be vertical, because this arrangement generally provides the best utilization of brake light 12 and mirror 14 by providing maximum extension of the mirror 14 and brake light 12 from the vehicle.

Conduit 28 communicates with both brake light 12 and the braking mechanism in such a manner that brake light 12 will be activated and light bulb 16 illuminated when the brakes of the vehicle are applied.

Preferably, brake light 12 will be mounted on the drivers side of the vehicle. If desired, brake light 12 may also be mounted on the passenger side of the vehicle. Most preferably, two side mounted brake lights 12 will be utilized: one on the passenger's side of the vehicle and one of the driver's side of the vehicle.

Preferably, brake lights 12 will be mounted in the same position, and in the same manner, as side mounted rear view mirrors would normally be mounted, and the same types of mounting will be used.

Preferably, cover 18 will be the standard red lens material utilized for traditional brake lights. Standard reflectors may also be utilized.

The present invention is not restricted to the particular structure and examples described above and illustrated in the attached drawings. Various modifications and variations can be made in the described structure by those skilled in the art without exceeding the scope of the invention as claimed hereinbelow.

I claim:

1. A sideview mirror-brake light device, comprising in combination:
   a housing for attachment to the side of a motor vehicle;
   a mirror on the rear surface of said housing;
   a brake light attached to said housing, said brake light being recessed with respect to said mirror such that it is shielded from the view of a primary driver;
   said brake light facing in a rearward direction;
   means in said housing for operatively connecting said brake light to a braking actuator;
   means for mounting said housing on the side of a vehicle;
   an opening defined in said housing for selectively receiving said brake light; and
   a tab on said brake light for facilitating movement of said brake light through said opening between a storage position within said housing and an operational position outside said housing.

2. The device of claim 1, wherein said housing is rectangular;
   said brake light is rectangular;
   said brake light being smaller than said housing; and
   said brake light including means for sliding said brake light between said storage position and said operational position.

3. The device of claim 2, further including a means for locking said brake light in said storage position and said operational position.

4. The device of claim 1 wherein said housing has a near vertical edge and far vertical edge relative to the vehicle it is to be mounted on; and
   said opening extends from said far vertical edge and inwardly of said housing towards said near vertical edge.

5. The device of claim 1, wherein said brake light has a circular portion containing a light bulb, and a handle emanating from said circular portion; and a pin through said handle supports said handle for rotation thereon, whereby said brake light can be rotated between said storage position and said operational position.

6. The device of claim 5, further including a means to prevent unwanted movement of said brake light from said storage and operational positions.

7. A sideview mirror-brake light device comprising in combination:
- a housing for attachment to the side of a motor vehicle;
- a mirror on the rear surface of said housing;
- a brake light attached to said housing, said brake light being recessed with respect to said mirror such that it is shielded from the view of a primary driver;
- said brake light facing in rearward direction;
- means in said housing for operatively connecting said brake light to a braking actuator;
- means for mounting said housing on the side of a vehicle;
- said housing having a rectangular shape including a vertical long side nearest the vehicle and a parallel second vertical long side, and a top horizontal short side, and a top horizontal short side and a bottom second horizontal short side parallel thereto;
- said mirror having a smaller rectangular shape than said housing;
- said mirror having a vertical long side abutting the vertical long side of said housing nearest the vehicle;
- said mirror has a top horizontal short side abutting said top horizontal short side of said housing;
- an L-shaped margin is defined by the remaining sides of said mirror and said housing; and
- said brake light is L-shaped and in registration with said L-shaped margin.

8. The device of claim 7, wherein said brake light includes a set of light bulbs.

* * * * *